(12) United States Patent
Ikemoto et al.

(10) Patent No.: US 8,238,396 B2
(45) Date of Patent: Aug. 7, 2012

(54) GAS LASER OSCILLATOR HAVING FUNCTION FOR JUDGING DISCHARGE INITIATION

(75) Inventors: Hajime Ikemoto, Minamitsuru-gun (JP); Masahiro Honda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/038,548

(22) Filed: Mar. 2, 2011

(65) Prior Publication Data

US 2011/0243168 A1    Oct. 6, 2011

(30) Foreign Application Priority Data

Apr. 5, 2010   (JP) ................................. 2010-087107

(51) Int. Cl.
*H01S 3/13*   (2006.01)
*H01S 3/00*   (2006.01)
*H01S 3/22*   (2006.01)
*H01S 3/223*  (2006.01)

(52) U.S. Cl. .................... 372/38.07; 372/29.021; 372/55

(58) Field of Classification Search ............. 372/29.021, 372/38.07, 55
See application file for complete search history.

(56) References Cited

FOREIGN PATENT DOCUMENTS

| JP | 2-126690   | 5/1990 |
|----|------------|--------|
| JP | 4-236476   | 8/1992 |
| JP | 7-221378   | 8/1995 |
| JP | 9-085474   | 3/1997 |
| JP | 2006-156634| 6/2006 |
| JP | 2008-004773| 1/2008 |

*Primary Examiner* — Armando Rodriguez
(74) *Attorney, Agent, or Firm* — Drinker Biddle & Reath LLP

(57) ABSTRACT

A gas laser oscillator capable of initiating discharge, without applying excess voltage to a discharge tube, and correctly and rapidly judging the initiation of discharge. The oscillator has a laser power commanding part adapted to generate a laser power command including a pulse superimposed on a forefront of each step, a voltage applying part adapted to apply a voltage to a discharge tube based on the laser power command, a discharge tube voltage detecting part adapted to detect the discharge tube voltage, a discharge tube voltage monitoring part adapted to monitor the discharge tube voltage, and a discharge initiation judging part adapted to judge that the discharge is initiated when the difference, between a change rate of the monitored voltage and a change rate of the discharge tube voltage predetermined based on data obtained while the discharge is normally carried out, is smaller than a predetermined threshold.

2 Claims, 2 Drawing Sheets

GAS LASER OSCILLATOR HAVING FUNCTION FOR JUDGING DISCHARGE INITIATION

RELATED APPLICATIONS

The present application claims priority from Japanese Patent Application No. 2010-87107, filed on Apr. 5, 2010, the entire contents of which are fully incorporated herein by reference.

BACKGROUND OF THE INVENTION

1. Field of the Invention

The present invention relates to a gas laser oscillator having a function for judging initiation of discharge in a discharge tube of the oscillator.

2. Description of the Related Art

In a gas laser unit of the prior art, in order to initiate discharge at the time of startup of the gas laser unit, gas pressure within a discharge tube is lowered considerably. However, starting with such a low gas pressure, it takes a long time to increase the gas pressure so as to obtain a desired laser output. For example, Japanese Unexamined Patent Publication (Kokai) No. 2-126690 discloses a gas laser control unit, intended to generate a trigger arc in a discharge tube, wherein an ignite pulse is generated for supplying high-frequency power to a discharge tube at predetermined intervals so as to obtain a voltage equal to or larger than at the time of initiation of discharge.

On the other hand, as a technique for detecting initiation of discharge, Japanese Unexamined Patent Publication (Kokai) No. 7-221378 discloses a technique for detecting the initiation of discharge based on transition of characteristics of an output current, and detecting abnormal laser gas.

In the invention of Japanese Unexamined Patent Publication (Kokai) No. 2-126690, if a pulse having a needlessly large peak value or width is superimposed at constant intervals when it is difficult to initiate discharge, a switching semiconductor of a laser power supply may be overloaded, and the laser power supply may be damaged. Further, Japanese Unexamined Patent Publication (Kokai) No. 2-126690 does not disclose a particular technique for judging the initiation of discharge. Therefore, when a plurality of pulses are superimposed, a monitored value (or detected value) of the voltage of the discharge is affected by the superimposed pulses, and the initiation of discharge cannot be correctly judged.

In the invention of Japanese Unexamined Patent Publication (Kokai) No. 7-221378, since it is usually difficult to initiate the discharge under the high gas pressure, excess voltage may be applied to the discharge tube and an excess current may flow in the laser power supply before the transition of the characteristics of the output current occurs, depending on change of the state (for example, a pressure, a flow rate and a composition) of the laser gas. As a result, the discharge tube and/or the laser power supply may be damaged. Further, the characteristic of the output current, measured by a DC power supply part in the laser power supply, is varied depending on a plurality of components, i.e., an RF power supply part, a matching unit and a discharge tube. Therefore, it is difficult to correctly judge the initiation of discharge only.

SUMMARY OF THE INVENTION

An object of the present invention is to provide a gas laser oscillator capable of initiating discharge, without applying excess voltage to a discharge tube, and correctly and rapidly judging the initiation of discharge.

Accordingly, the invention provides a gas laser oscillator comprising: a laser power commanding part adapted to generate a laser power command including a first laser power command which increases in a stepwise manner at first time intervals and a second laser power command superimposed on a forefront of each step of the first laser power command for a second time interval which is smaller than the first time interval, a magnitude of the second laser power command being larger than a magnitude of the first laser power command; a voltage applying part adapted to apply a voltage to a discharge tube based on the laser power command generated by the laser power commanding part; a discharge tube voltage detecting part adapted to detect a voltage of the discharge tube while the voltage applying part applies the voltage to the discharge tube; a discharge tube voltage monitoring part adapted to monitor the voltage of the discharge tube detected by the discharge tube voltage detecting part; and a discharge initiation judging part adapted to judge that the discharge is initiated in the discharge tube when a difference, between a change rate of the voltage of the discharge tube relative to the laser power command, monitored by the discharge tube voltage monitoring part and a change rate of the voltage of the discharge tube relative to the laser power command, predetermined based on data obtained while the discharge is normally carried out in the discharge tube, is smaller than a predetermined threshold.

In a preferred embodiment, the first time interval is within a range of 0.1 to 1 seconds, and the second time interval is equal to or less than 100 microseconds.

In a preferred embodiment, a maximum laser power command, in each step after the second laser power command is superimposed on each step, is equal to or larger than a laser power command corresponding to a half of a rated laser output or a maximum laser output, and is equal to or smaller than a laser power command corresponding to the rated laser output or the maximum laser output.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
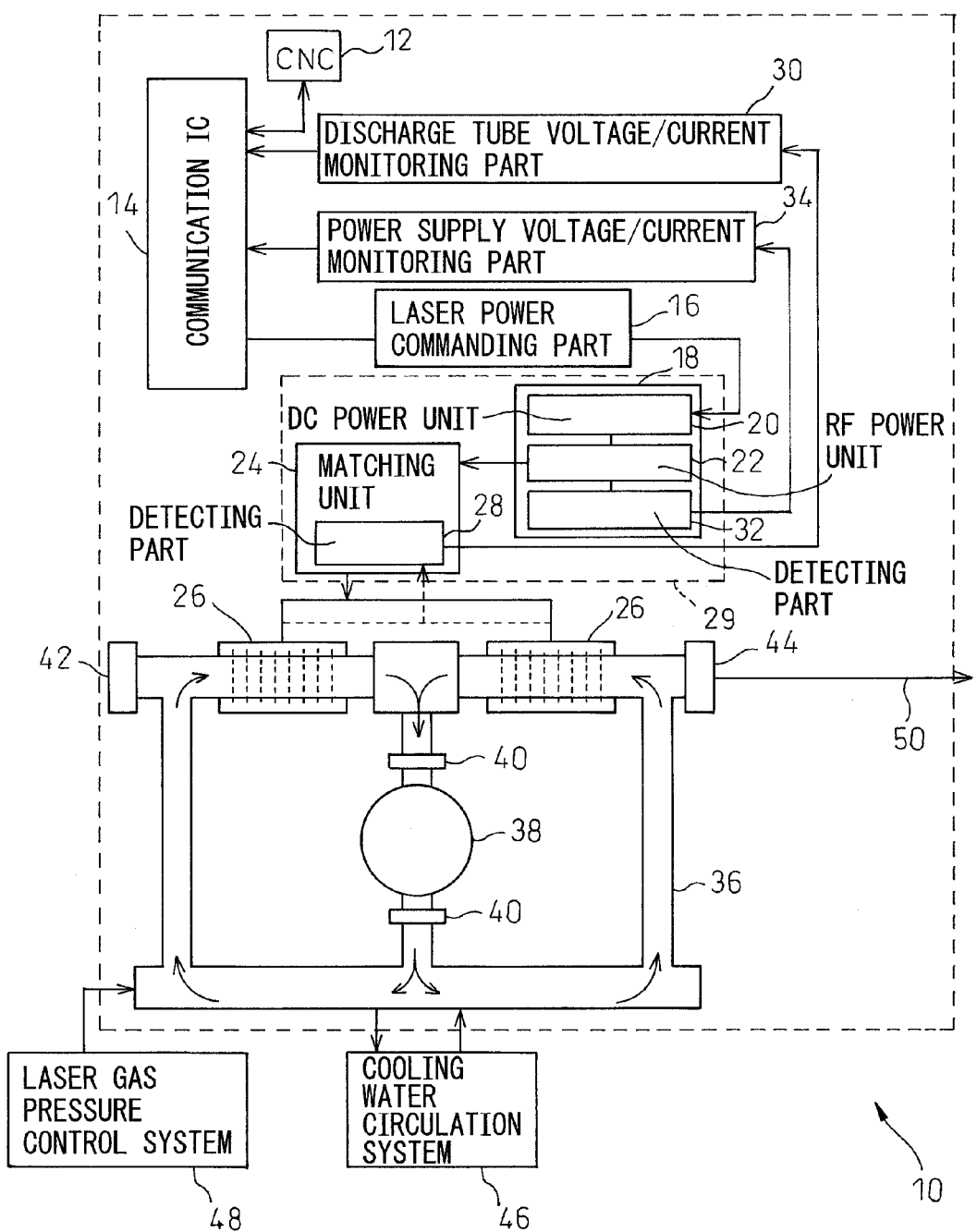
FIG. 1 shows a schematic configuration of a gas laser oscillator according to one embodiment of the present invention.

FIG. 1 shows a schematic configuration of a gas laser oscillator 10 according to a preferred embodiment of the invention. Gas laser oscillator 10 includes a numerical controller (CNC) 12 adapted to control the general operation of oscillator 10, a communication IC (integrated circuit) 14 adapted to communicate with CNC 12, a laser power commanding part 16 adapted to generate a laser power command based on a signal or command transmitted from CNC 12 to communication IC 14, and a laser power supply 18 adapted to output a laser power based on the laser power command. Laser power supply 18 has a DC power unit 20 and a RF power unit 22. An output of DC power unit 20, which is controlled by the power supply command from laser power commanding part 16, is converted into high-frequency power by means of RF power unit 22. The high-frequency power is supplied to a matching unit 24, and then matching unit 24 applies a voltage according to the laser power command to a discharge tube 26. In this embodiment, laser power supply 18 and matching unit 24 cooperatively constitute a voltage applying part 29.

Matching unit 24 has a discharge tube voltage/current detecting part 28 adapted to detect a voltage and a current applied to discharge tube 26, and data of the voltage and the current of discharge tube 26 detected by voltage/current detecting part 28 is transmitted to and monitored by a discharge tube voltage/current monitoring part 30. The monitored data is transmitted to CNC 12 via communication IC 14, and a process for judging initiation of discharge, as described below, is carried out. In other words, in this embodiment, CNC 12 functions as a discharge initiation judging part. In addition, discharge tube voltage/current detecting part 28 may be replaced with one which detects only the voltage of discharge tube 26, and discharge tube voltage/current monitoring part 30 may be replaced with one which monitors only the voltage of discharge tube 26.

Laser power supply 18 may have a power supply voltage/current detecting part 32 adapted to detect the voltage and the current outputted by laser power supply 18, and data of the voltage and the current of laser power supply 18 detected by voltage/current detecting part 32 is transmitted to and monitored by a power supply voltage/current monitoring part 34. The monitored data is transmitted to CNC 12 via communication IC 14, and emergency stop of laser oscillation may be carried out if the data shows an error or abnormality.

Discharge tube 26 is fluidically communicated with a gas flow channel 36 in which laser gas or laser medium is filled, and thus discharge tube 26 is also filled by laser gas. The laser gas is circulated in a direction indicated by an arrow, within the laser oscillator, by means of an air conveying unit 38 such as a turbo blower, while being cooled by heat exchangers 40 positioned on both sides of turbo blower 38. Reference numerals 42 and 44 represent a total reflection mirror positioned at one end of discharge tube 26, and a semitransparent mirror positioned at the other end of discharge tube 26. Discharge tube 26 and mirrors 42, 44 cooperatively constitute a laser resonator. A schematically illustrated cooling water circulation system 46 supplies cooling water in order to cool heat exchangers 40 and gas flow channel 36. A schematically illustrated laser gas control system 48 controls the gas pressure within gas flow channel 36 and discharge tube 26 at an appropriate value.

When high-frequency voltage is supplied to discharge tube 26, the laser gas within the discharge tube is excited by discharging and light is generated at the resonator. The generated light is repeatedly reflected between mirrors 42 and 44 and amplified by induced emission. A part of the amplified light is outputted from semitransparent mirror 44 as a laser beam 50 and used for laser cutting or the like.

Figure 2:
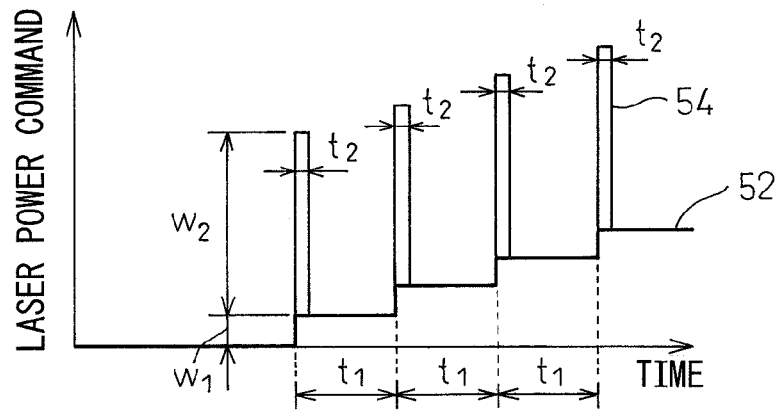
FIG. 2 shows a graph indicating one example of a laser power command.

Next, the detail of the laser power command outputted by the laser power commanding part will be explained. As shown in FIG. 2, as a preliminary step for transition to the operating condition of the oscillator, from the state wherein the laser power (voltage) command value to laser power supply 18 is equal to zero, a first laser power command 52, which increases in a stepwise manner at predetermined first time intervals $t_1$ (for example, 0.1 to 1 seconds), is outputted, while each step of first laser power command 52 has a predetermined magnitude or width $w_1$. In the invention, a second laser power command 54 is superimposed on a forefront of each step of first laser power command 52 for a predetermined second time interval $t_2$ (for example, equal to or smaller than 100 microseconds) which is smaller than first time interval $t_1$, while each step of second laser power command 54 has a predetermined magnitude or width $w_2$ larger than width $w_1$, so that the laser power becomes sufficiently larger than a power supply required for initiating the discharge. Due to this, even in high gas pressure relative to the laser operating condition, the discharge may be stably initiated.

In FIG. 2, pulse 54 on each step is superimposed on only the forefront portion of the step, and the maximum laser power command of each step, after the superimposing, is set to a value which is equal to or larger than a laser power command corresponding to ⅓, ½ or ⅔ of a rated laser output or a maximum laser output (i.e., the value is larger than a laser power command at which the discharge can initiate). For example, when the laser power command (or a peak value) of the first step, after the superimposing, is equal to a value which corresponds to a half (½) of a rated laser output, the laser power command gradually increases after the first step, and the superimposing is stopped when it is judged that the discharge is initiated. In this regard, while the laser power command in each step gradually increases until the discharge is initiated, it is preferable that the peak value in each step is controlled so as to not exceed a value which corresponds to the rated laser output or the maximum laser output. For example, in the case that the peak value exceeds a value corresponding to the rated laser output if a pulse having width $w_2$, which is equal to the width in the immediately previous step, is superimposed in a certain step, a pulse having a width smaller than $w_2$ is superimposed in the certain step, so that the peak value does not exceeds the value corresponding to the rated laser output. Due to this, the discharge tube and/or the laser power supply may be prevented from being damaged, by avoiding of excess voltage being applied to the discharge tube and/or excess current flows in the laser power supply.

Figure 3:
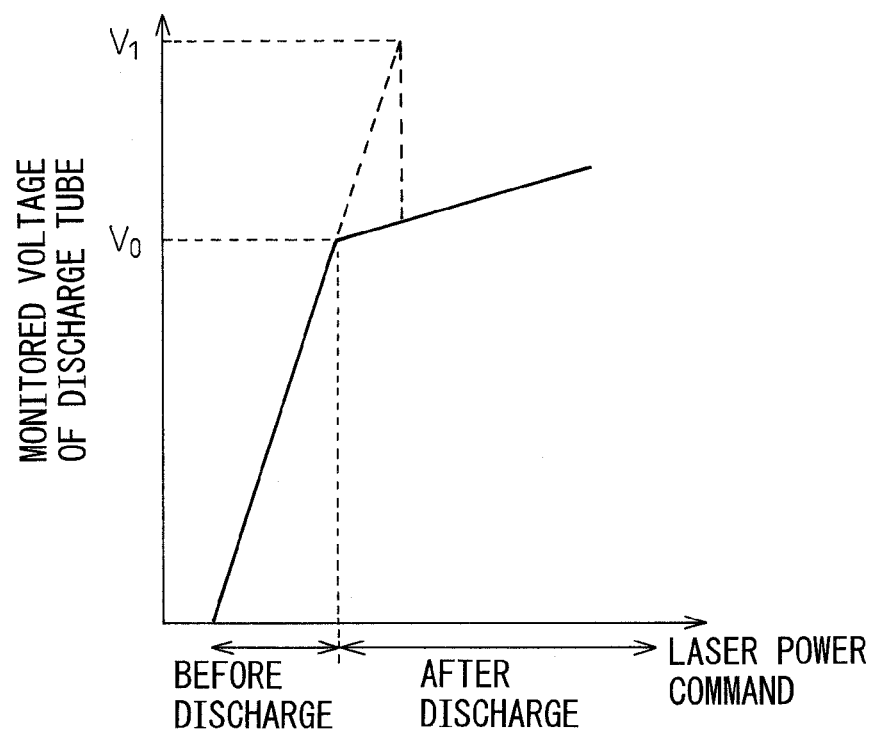
FIG. 3 shows a graph indicating one example of a change in a monitored voltage of a discharge tube, from when the discharge in the gas laser oscillator is stopped to when the laser beam may be outputted, according to the laser power command of FIG. 2.

FIG. 3 shows a graph of change in monitored voltage of the discharge tube when the output of laser power supply is controlled based on the laser power command as shown in FIG. 2. As described above, a period of time (second time interval $t_2$), during which the pulse having second width $w_2$ is superimposed on each step, is considerably shorter (for example, from 10 to 100 microseconds) than first time interval $t_1$ (or several hundreds-millisecond order). Therefore, as shown in FIG. 3, the monitored (or detected) voltage of the discharge tube is equivalent to the voltage when the pulse is not superimposed (in other words, the influence of the superimposed pulse, relative to the monitored voltage of the discharge tube, may be disregarded). Due to this, the voltage of the discharge tube may be precisely measured.

When the command is increased in a stepwise manner while each step has a predetermined laser power command width, as shown in FIG. 2, a change rate of the discharge tube voltage corresponding to the laser power command before the initiation of discharge is larger than a change rate of the discharge tube voltage after the initiation of discharge. Further, each change rate is not varied depending on the condition of the laser gas. Accordingly, in the invention, a change rate of the discharge tube voltage relative to the laser power command, after the initiation of the discharge in normal time (while the discharge is normally carried out, for example, at the time of factory shipment or time-proven normal operation), is stored in a storing means such as a memory, and the discharge tube voltage is measured in each step. The stored change rate after the initiation of discharge is compared to a change rate calculated based on a difference between discharge tube voltages of neighboring steps, at proper intervals. Then, when the compared change rates are substantially the same, i.e., the difference between the compared change rates is equal to or smaller than a predetermined threshold (concretely, the monitored change in the discharge tube voltage transits from a before discharge state (a steep-slope in the graph) to an after discharge state (a mild-slope in the graph)), it may be judged that the discharge is initiated.

In the conventional laser startup method wherein a pulse is not superimposed on the front end of each step, as shown in a dotted line in FIG. 3, the discharge may not be initiated, depending on the condition of the laser gas or the like, even when the discharge tube voltage reaches voltage $V_0$ at which the discharge is initiated in the normal operation. In this case, the discharge tube voltage is increased to voltage $V_1$ larger than $V_0$, until the discharge is initiated, which may cause malfunction or damage of the discharge tube and/or the laser power supply. However, in the invention, by superimposing a pulse on a stepwise laser power command, the discharge is assuredly initiated at or near voltage $V_0$. Further, the initiation of the discharge is assuredly judged by monitoring the discharge tube voltage. In addition, the initiation of the discharge is judged based on the change rate of the discharge tube voltage, not based on the output of the laser power supply, whereby the initiation of the discharge may be correctly judged without being subjected to the influence of the RF power supply and/or the matching unit.

According to the present invention, the initiation of the discharge in the gas laser oscillator may be rapidly and correctly judged, whereby malfunction or damage of each component of the oscillator due to misjudge of the discharge initiation may be avoided.

Since the second time interval is significantly smaller than the first time interval, the voltage of the discharge tube is not subjected to the influence of the second laser power command, whereby the discharge tube voltage is correctly measured.

Due to the feature that the maximum laser power command in each step is equal to or larger than a laser power command corresponding to a half of a rated laser output or a maximum laser output, the discharge tube is in a state wherein the discharge may be stably initiated. Further, due to the feature that the maximum laser power command in each step is equal to or smaller than a laser power command corresponding to the rated laser output or the maximum laser output, malfunction or damage of each component of the laser oscillator due to the excess voltage or current may be avoided.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A gas laser oscillator comprising:
a laser power commanding part adapted to generate a laser power command including a first laser power command which increases in a stepwise manner at first time intervals and a second laser power command superimposed on a forefront of each step of the first laser power command for a second time interval which is smaller than the first time interval, a magnitude of the second laser power command being larger than a magnitude of the first laser power command;
a voltage applying part adapted to apply a voltage to a discharge tube based on the laser power command generated by the laser power commanding part;
a discharge tube voltage detecting part adapted to detect a voltage of the discharge tube while the voltage applying part applies the voltage to the discharge tube;
a discharge tube voltage monitoring part adapted to monitor the voltage of the discharge tube detected by the discharge tube voltage detecting part; and
a discharge initiation judging part adapted to judge that the discharge is initiated in the discharge tube when a difference, between a change rate of the voltage of the discharge tube relative to the laser power command, monitored by the discharge tube voltage monitoring part and a change rate of the voltage of the discharge tube relative to the laser power command, predetermined based on data obtained while the discharge is normally carried out in the discharge tube, is smaller than a predetermined threshold,
wherein the first time interval is within a range of 0.1 to 1 seconds, and the second time interval is within a range of 10 microseconds to 100 microseconds.

2. The gas laser oscillator as set forth in claim 1, wherein a maximum laser power command, in each step after the second laser power command is superimposed on each step, is equal to or larger than a laser power command corresponding to a half of a rated laser output or a maximum laser output, and is equal to or smaller than a laser power command corresponding to the rated laser output or the maximum laser output.

* * * * *